US012578728B2

(12) United States Patent
Yamamura et al.

(10) Patent No.: US 12,578,728 B2
(45) Date of Patent: Mar. 17, 2026

(54) AUTONOMOUS SNOW REMOVING MACHINE

(71) Applicant: HONDA MOTOR CO., LTD., Tokyo (JP)

(72) Inventors: Makoto Yamamura, Wako (JP); Takamasa Udagawa, Wako (JP); Yoshiaki Kotani, Wako (JP); Hiroya Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/462,919

(22) Filed: Sep. 7, 2023

(65) Prior Publication Data

US 2023/0418301 A1 Dec. 28, 2023

Related U.S. Application Data

(63) Continuation of application No. 17/003,472, filed on Aug. 26, 2020, now abandoned.

(30) Foreign Application Priority Data

Sep. 4, 2019 (JP) ................................. 2019-161061

(51) Int. Cl.
  *G05D 1/00* (2024.01)
  *E01H 5/09* (2006.01)
(52) U.S. Cl.
  CPC ............. *G05D 1/0219* (2013.01); *E01H 5/09* (2013.01); *G05D 1/0234* (2013.01)
(58) Field of Classification Search
  CPC .. G05D 1/0219; G05D 1/0234; G05D 1/0044; G05D 1/0246; G05D 1/0257; E01H 5/09
  See application file for complete search history.

(56) References Cited

U.S. PATENT DOCUMENTS

2005/0287038 A1 12/2005 Dubrovsky et al.
2011/0153072 A1* 6/2011 Anderson ................ G01S 5/16
                                              700/245

(Continued)

FOREIGN PATENT DOCUMENTS

CN     107402573 B    5/2021
JP   2003-138513 A    5/2003

(Continued)

OTHER PUBLICATIONS

JP-2017040076-A Translation (Year: 2017).*
Japanese Office Action, Application No. JP 2019-161061, dated Aug. 30, 2022, with English translation, 11 pages.

*Primary Examiner* — Kenneth J Malkowski
*Assistant Examiner* — Ibrahim Abdoalatif Alsomairy
(74) *Attorney, Agent, or Firm* — Rankin, Hill & Clark LLP

(57) ABSTRACT

An autonomous snow removing machine includes: traveling apparatuses; a snow removal work unit; a region setting unit that sets a snow removal work region in which snow removal is performed by the snow removal work unit; and a control unit that controls the traveling apparatuses such that the traveling apparatuses do not deviate from the snow removal work region set by the region setting unit. As a result, the snow removal work can be performed while causing the autonomous snow removing machine to autonomously travel by controlling the traveling apparatuses in the snow removal work region set by the region setting unit.

1 Claim, 5 Drawing Sheets

(56)                    References Cited

U.S. PATENT DOCUMENTS

| | | | |
|---|---|---|---|
| 2014/0121881 A1* | 5/2014 | Diazdelcastillo | G05D 1/0274 |
| | | | 180/9.1 |
| 2014/0180478 A1 | 6/2014 | Letsky | |
| 2014/0207282 A1 | 7/2014 | Angle et al. | |
| 2017/0017234 A1* | 1/2017 | Wilson | E01H 1/00 |
| 2018/0317725 A1* | 11/2018 | Lee | B25J 15/0491 |
| 2019/0003137 A1* | 1/2019 | Gao | G01S 15/931 |
| 2019/0323190 A1* | 10/2019 | Waelbers | A46B 7/04 |
| 2020/0156593 A1 | 5/2020 | Boss et al. | |

FOREIGN PATENT DOCUMENTS

| | | | |
|---|---|---|---|
| JP | 2008-81966 A | | 4/2008 |
| JP | 2015-178707 A | | 10/2015 |
| JP | 2016-212697 A | | 12/2015 |
| JP | 2017-040076 | | 2/2017 |
| JP | 2017040076 A | * | 2/2017 |
| WO | 2020/197913 A2 | | 10/2020 |

* cited by examiner

FIG.4

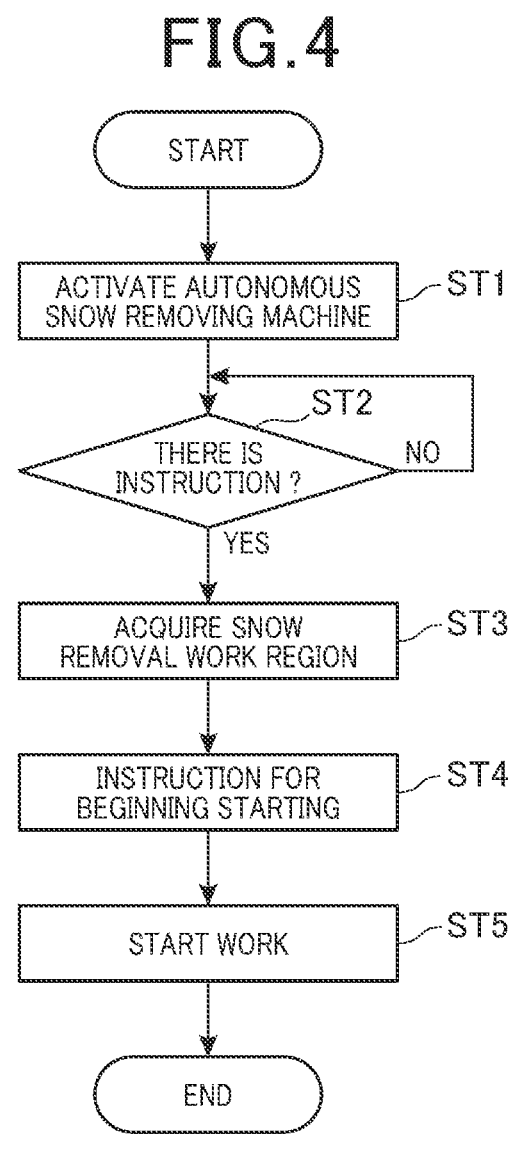

START

ACTIVATE AUTONOMOUS SNOW REMOVING MACHINE — ST1

THERE IS INSTRUCTION ? — ST2

NO

YES

ACQUIRE SNOW REMOVAL WORK REGION — ST3

INSTRUCTION FOR BEGINNING STARTING — ST4

START WORK — ST5

END

AUTONOMOUS SNOW REMOVING MACHINE

INCORPORATION BY REFERENCE

The present application is a continuation of and claims priority under 35 U.S.C. § 120 to U.S. application Ser. No. 17/003,472, filed Aug. 26, 2020, and claims priority under 35 U.S.C. § 119 to Japanese Patent Application No. 2019-161061 filed on Sep. 4, 2019. The content of these applications is incorporated herein by reference in its entirety.

BACKGROUND OF THE INVENTION

Field of the Invention

The present invention relates to an autonomous snow removing machine, and particularly to an autonomous snow removing machine capable of performing snow removal work while autonomously traveling.

Description of the Related Art

Hitherto, a snow removing machine for removing fallen snow on a road and the like has been known.

As a snow removing machine as above, for example, an autonomous snow removing machine that includes a location information system, a system controller having a computer built therein, and a fallen snow monitoring system, and performs work such as snow removal in accordance with an instruction from a system controller on the basis of image pickup of fallen snow performed by a monitoring camera in the fallen snow monitoring system or snowfall detection information has been known (for example, see Japanese Patent Laid-Open No. 2017-040076).

However, in the technology of the related art, work such as the snow removal is performed along a navigation passage or in an area preset by the instruction from the system controller, but it may be difficult to travel the set passage in a region in which the accuracy of a GPS is low.

Aspects of the present invention have been made in view of the abovementioned matter, and an object thereof is to provide an autonomous snow removing machine capable of performing snow removal work by autonomously traveling with a high accuracy.

SUMMARY OF THE INVENTION

In order to attain the abovementioned object, an aspect of the present invention is an autonomous snow removing machine that autonomously travels in a predetermined snow removal work region, the autonomous snow removing machine including: a traveling apparatus; a snow removal work unit; a region setting unit that sets a snow removal work region in which snow removal is performed by the snow removal work unit; and a control unit that controls the traveling apparatus such that the traveling apparatus does not deviate from the snow removal work region set by the region setting unit.

In the abovementioned configuration, a communication unit that communicates with a mobile terminal apparatus of a user is further included.

In the abovementioned configuration, the region setting unit includes an image pickup apparatus that photographs a marker formed on a pole, for work, installed on a boundary of the snow removal work region, and the control unit reads the marker and sets the snow removal work region on basis of an image photographed by the image pickup apparatus.

In the abovementioned configuration, the control unit sets the snow removal work region on basis of information set by the mobile terminal apparatus and transmitted via the communication unit.

In the abovementioned configuration, the control unit sets a snow collecting region in which removed snow is collected when the snow removal work region is set, and the control unit controls the snow removal work unit such that the snow removal work unit collects, in the snow collecting region, snow that has fallen in the snow removal work region.

In the abovementioned configuration, a pole, for snow collection, that is different from the pole for work is installed on a boundary of the snow collecting region, and the control unit sets the snow collecting region on basis of a marker formed on the pole for snow collection.

In the abovementioned configuration, a location detecting unit that detects a current location is further included, and the control unit acquires the current location obtained by the location detecting unit, and sets a temporary snow collecting region between the current location and the snow collecting region when a distance between the current location and the snow collecting region is a certain distance or more.

In the abovementioned configuration, the snow removal work unit includes an auger that collects snow, and a blower that blows the snow collected by the auger, the snow removal work unit collecting snow by blowing snow in the snow removal work region toward the snow collecting region with use of the auger and the blower.

In the abovementioned configuration, the snow removal work unit includes a blade for pushing snow and collects snow by pushing snow in the snow removal work region toward the snow collecting region with use of the blade.

In the abovementioned configuration, the control unit is capable of setting a work schedule for snow removal work, and the control unit removes snow by controlling the snow removal work unit on basis of the work schedule.

In the abovementioned configuration, the control unit acquires a wake-up time of the user and sets the work schedule such that the snow removal work is completed by a predetermined amount or more at the wake-up time.

In the abovementioned configuration, the control unit acquires the wake-up time from an alarm time set on the mobile terminal apparatus of the user via the communication unit.

In the abovementioned configuration, the control unit acquires location information of the mobile terminal apparatus of the user via the communication unit and sets the work schedule for the snow removal work on basis of the location information of the mobile terminal apparatus.

In the abovementioned configuration, on basis of the location information of the mobile terminal apparatus of the user, the control unit estimates a time at which the user reaches the snow removal work region, and sets the work schedule such that the snow removal work is completed by a predetermined amount or more at the estimated reaching time.

In the abovementioned configuration, the control unit acquires weather forecast information from the mobile terminal apparatus of the user via the communication unit, estimates a snowfall amount in the snow removal work region on basis of the weather forecast information, and sets the work schedule on basis of the estimated snowfall amount.

In the abovementioned configuration, the control unit transmits a collecting request to a snow removal contractor from the communication unit via the mobile terminal apparatus when an amount of the snow collected in the snow collecting region becomes a certain amount or more.

In the abovementioned configuration, at time of snow removal work performed by the snow removal work unit, the snow removal work is performed while a snow melting agent is sprinkled.

According to an aspect of the present invention, the snow removal work is able to be performed while causing the autonomous snow removing machine to autonomously travel with a high accuracy by controlling the traveling apparatus in the snow removal work region set by the region setting unit.

BRIEF DESCRIPTION OF THE DRAWINGS

FIG. 4 is a flowchart illustrating a starting operation of this embodiment; and

DETAILED DESCRIPTION OF THE PREFERRED EMBODIMENT

An embodiment of the present invention is described with reference to drawings below.

Figure 1:
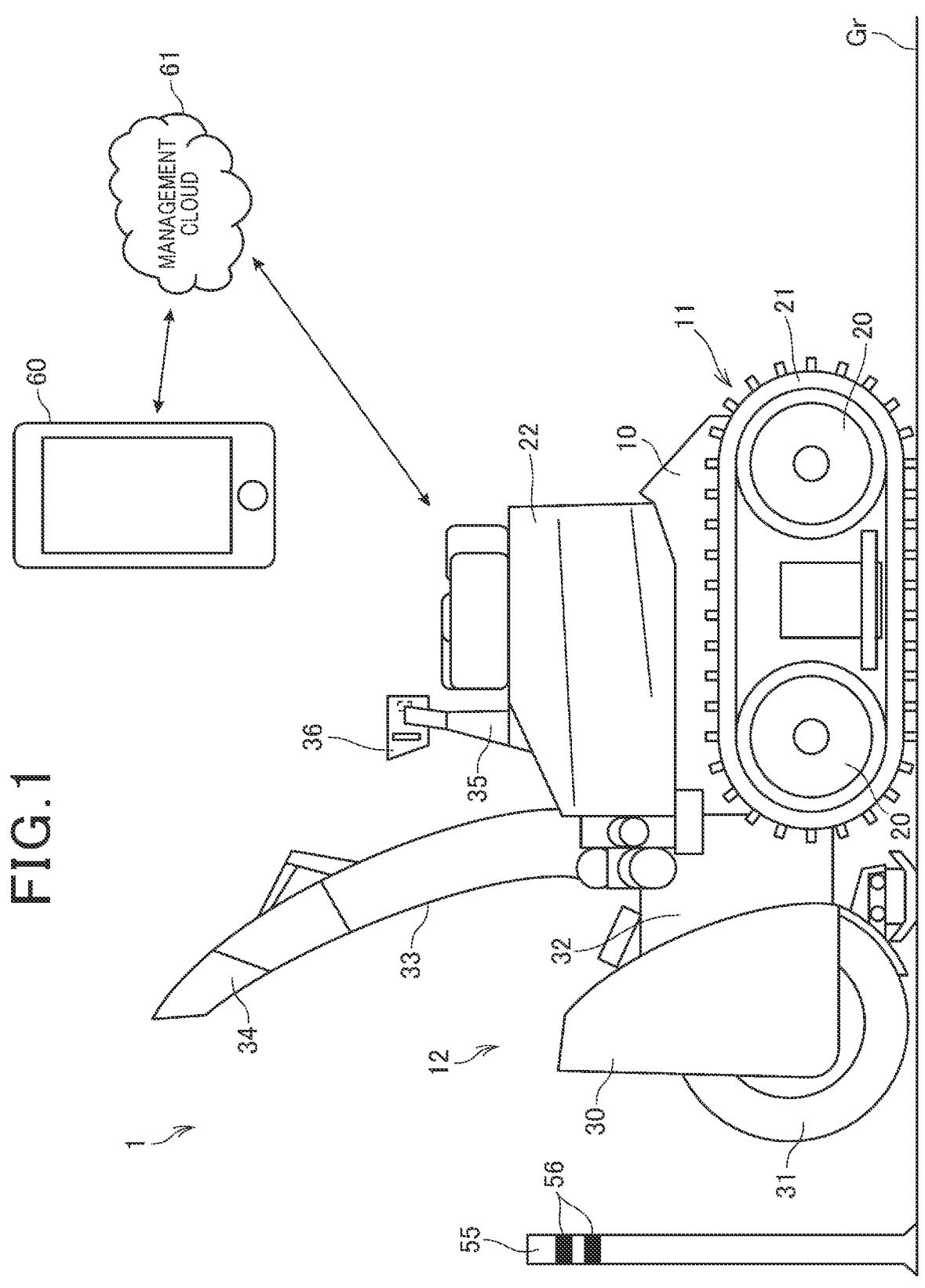
FIG. 1 is a side view illustrating an embodiment of an autonomous snow removing machine according to the present invention.

FIG. 1 is a side view illustrating an embodiment of an autonomous snow removing machine according to the present invention.

As illustrated in FIG. 1, an autonomous snow removing machine 1 includes a vehicle main body 10 forming a frame of the autonomous snow removing machine 1, traveling apparatuses 11, and a snow removal work unit 12.

The traveling apparatuses 11 are provided on both of left and right sides of the vehicle main body 10 on a lower side thereof.

In this embodiment, as the traveling apparatuses 11, crawler-type traveling apparatuses 11 each formed by bridging a crawler track 21 over a pair of wheels 20 are used.

A power source 22 is mounted on a substantially central portion of the vehicle main body 10 in the front-rear direction. The power source 22 includes electric motors 23 (see FIG. 2) that drive the traveling apparatuses 11, and an engine 24 (see FIG. 2) that drives the snow removal work unit 12.

Each of the electric motors 23 is provided for each of the left and right traveling apparatuses 11, and the autonomous snow removing machine 1 can be caused to travel to a freely-selected direction, for example, moved forward, moved backward, rotated to the left, and rotated to the right by driving the left and right traveling apparatuses 11 by the electric motors 23.

The engine 24 adjusts the rotating speed by operating a throttle 25 and drives the snow removal work unit 12 via a transmission (not shown). A power generator (not shown) is provided on a drive shaft of the engine 24, and the power generated by the power generator is supplied to a battery 26 (see FIG. 2) that supplies operation power to each unit.

As illustrated in FIG. 1, an auger housing 30 extending in the width direction of the vehicle main body 10 and forming a part of the snow removal work unit 12 is provided ahead of the vehicle main body 10. In the auger housing 30, an auger 31 is provided in a rotatably drivable manner. The auger housing 30 covers an upper portion and both side portions of the auger 31.

A blower housing 32 that covers a blower (not shown) is provided behind the auger housing 30, and a shooter 33 is provided on an upper portion of the blower housing 32.

The shooter 33 is mounted so as to be rotatable in a substantially horizontal direction with respect to the blower housing 32. The shooter 33 can adjust the direction in which snow is thrown by the shooter 33 by being rotatably driven by a shooter driving motor (not shown).

On an upper end portion of the shooter 33, a shooter guide 34 is mounted so as to be able to vertically reciprocate. The shooter guide 34 can adjust the snow-throwing angle by being driven in a vertically reciprocating manner by a guide driving motor (not shown).

The autonomous snow removing machine 1 can collect snow by the auger 31 and throw the collected snow to a far place by the blower via the shooter 33 while traveling forward by the left and right traveling apparatuses 11.

A pair of arms 35 are provided on an upper portion of the power source 22 on the front side thereof in a standing manner so as to be spaced apart from each other to the left and the right, and a headlight 36 that outputs illumination light is supported by upper ends of those arms 35.

Although not shown in FIG. 1, on the vehicle main body 10, a camera 37 forming a region setting unit and serving as an image pickup apparatus, a radar system 38 such as a LiDAR, a GPS system 39, and the battery 26 that supplies operation power to the units of the autonomous snow removing machine 1 (see FIG. 2 for all) are mounted.

The camera 37 may be one camera or a plurality of cameras and may be a stereo camera formed by two of the cameras 37, for example.

Figure 2:
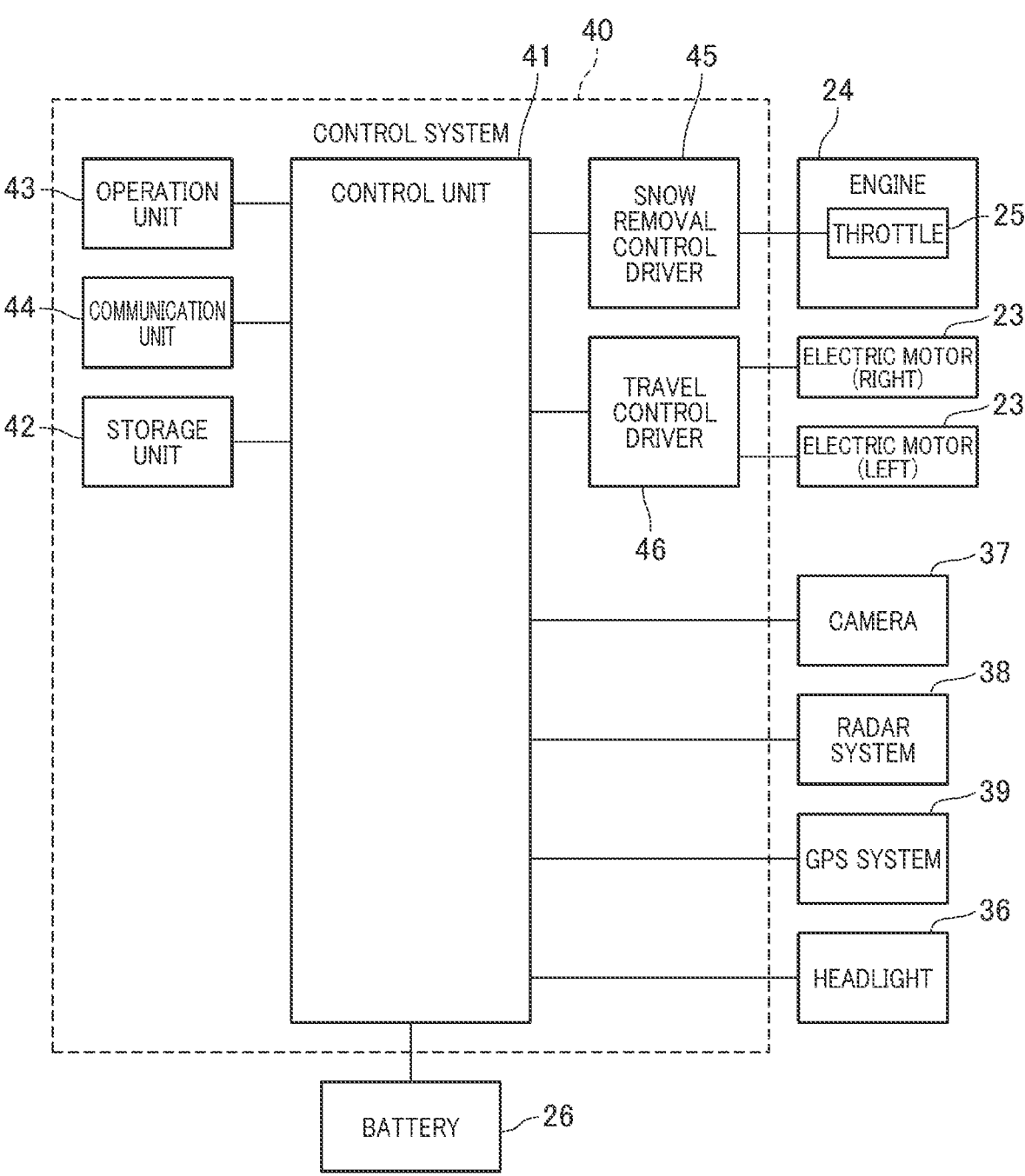
FIG. 2 is a block diagram illustrating a control configuration of this embodiment.

FIG. 2 is a block diagram illustrating a control configuration of the autonomous snow removing machine 1.

As illustrated in FIG. 2, the autonomous snow removing machine 1 includes a control system 40, and the control system 40 includes a control unit 41 including a CPU and the like, and a storage unit 42 including a RAM, a ROM, and the like.

The control unit 41 controls the units of the autonomous snow removing machine 1 by executing a control program stored in the storage unit 42.

The control system 40 includes an operation unit 43 including a user interface and the like, and a communication unit 44 (transmitter/receiver).

The operation unit 43 includes a function of being able to perform various operations such as a driving operation, a snow removal work operation, and an operation of setting the snow removal work region of the autonomous snow removing machine 1 by operating a touchscreen and the like, for example.

The communication unit 44 includes a function of performing data communication with a mobile terminal apparatus 60 such as a smartphone owned by a user via a management cloud 61 on the Internet and a communication function capable of making a phone call to the mobile terminal apparatus 60 via the management cloud 61. The communication unit 44 may be able to directly communicate with the mobile terminal apparatus 60.

The mobile terminal apparatus 60 includes a function of being able to perform various operations such as the driving operation, the snow removal work operation, and the operation of setting the snow removal work region of the autonomous snow removing machine 1 by operating a display screen.

The control unit 41 includes a snow removal control driver 45 for controlling the throttle 25 of the engine 24, and a travel control driver 46 for driving and controlling the electric motor.

The camera 37, the radar system 38, and the GPS system 39 are connected to the control unit 41.

The control unit 41 acquires image information from the camera 37 and performs image processing, to thereby set a predetermined snow removal work region as described below.

The control unit 41 acquires information from the radar system 38 and detects the existence of an obstacle ahead of the autonomous snow removing machine 1.

The control unit 41 can acquire the current location of the autonomous snow removing machine 1 by acquiring information of the GPS system 39.

Figure 3:
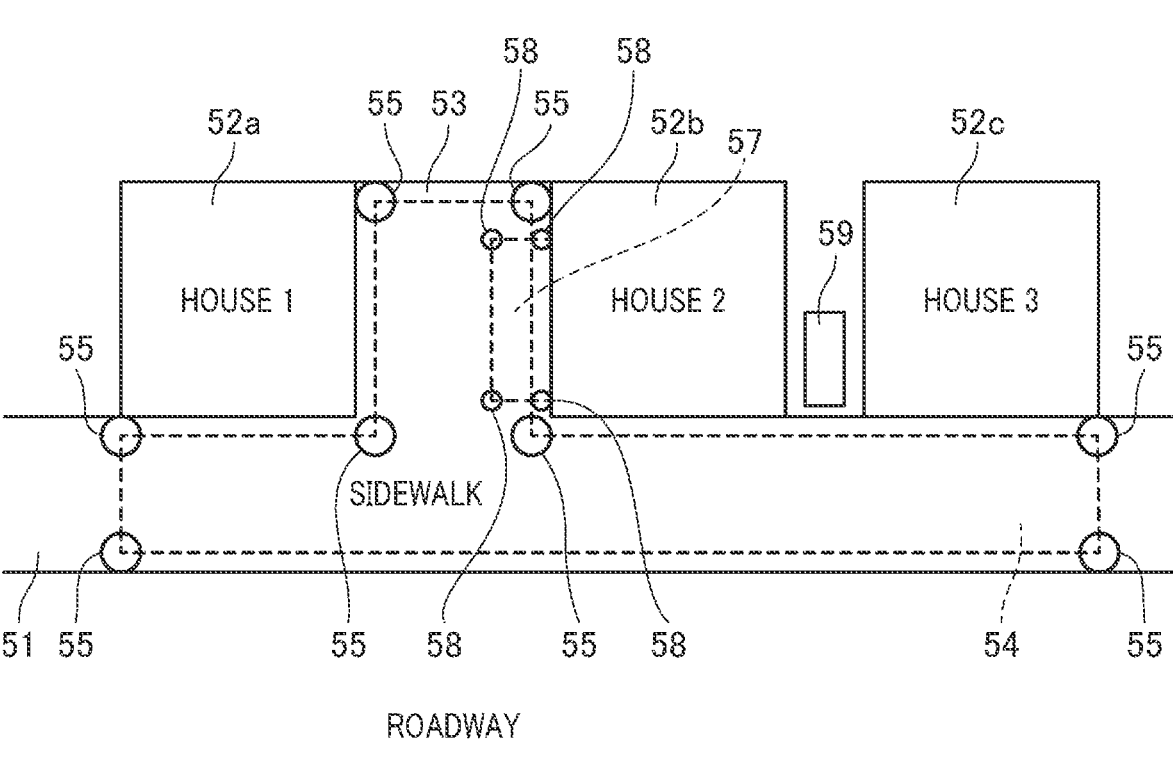
FIG. 3 is an explanatory diagram illustrating an example of a snow removal work region in which snow removal is performed by the autonomous snow removing machine of this embodiment.

FIG. 3 is an explanatory diagram illustrating an example of the snow removal work region in which snow removal by the autonomous snow removing machine 1 is performed.

FIG. 3 illustrates an example of a state in which a plurality of houses 52 are lined in a row along a sidewalk 51 on a road on which the sidewalk 51 is arranged to be adjacent to a roadway 50, for example.

When snow on the sidewalk 51 from a house (1) 52*a* to a house (3) 52*c* and a private road 53 between the house (1) 52*a* and a house (2) 52*b* is to be removed in a state in which the private road exists between the house (1) 52*a* and the house (2) 52*b* and the house (2) 52*b* and the house (3) 52*c* are arranged side by side, poles 55 for work indicating the boundary of the snow removal work region 54 are provided in a standing manner on end portions of the sidewalk 51 at an end portion of the house (1) 52*a*, corner portions of the private road 53, and end portions of the sidewalk 51 corresponding to an end portion of the house (3) 52*c*. A striped marker 56 (see FIG. 1), for example, is formed on an upper end portion of each of the pole 55 for work.

The control unit 41 performs processing of setting the snow removal work region 54 for setting the boundary of the snow removal work region 54 by setting a virtual wire linearly connecting the marker 56 and the marker 56 to each other by acquiring photographed images of the poles 55 for work photographed by the camera 37 of the autonomous snow removing machine 1 and detecting the markers 56 of the poles 55 for work.

In the processing of setting the snow removal work region 54, a snow collecting region 57 for collecting the removed snow is set. Poles 58 for snow collection are installed for the snow collecting region 57, and the snow collecting region 57 is set by detecting markers (not shown) of the poles 58 for snow collection.

In this case, in order to be distinguished from the markers of the poles 55 for work of the snow removal work region 54, markers of which number of stripes is different and markers of which thickness of stripes is different, for example, are used as the markers of the poles 58 for snow collection of the snow collecting region 57.

A standby place 59 where the autonomous snow removing machine 1 stands by is set between the house (2) 52*b* and the house (3) 52*c*.

The snow removal work region 54 and the snow collecting region 57 may use beacons and may be set on the basis of location information emitted from the beacons, for example, or may be set with use of map information of the mobile terminal apparatus 60, for example.

The snow removal work region 54 may be successively set by the control unit 41 on the basis of the photographed images photographed by the camera 37. In addition, the snow removal work region 54 that is once set on the basis of the photographed image of the camera 37, and the snow removal work region 54 preset by the mobile terminal apparatus 60 may be stored in the storage unit 42 of the control system 40 or may be stored in the management cloud 61 via the communication unit 44.

The control unit 41 performs location detection processing of the autonomous snow removing machine 1, self-traveling operation control of the autonomous snow removing machine 1, and snow removal operation control of the autonomous snow removing machine 1 in addition to performing the processing of setting the snow removal work region 54 as described above.

The location detection processing performed by the control unit 41 is processing of detecting the current location of the autonomous snow removing machine 1 on the basis of location information acquired by the GPS system 39 and information on the distance from the poles 55 for work, the house 52, and the like acquired by the radar system 38.

The self-traveling operation control performed by the control unit 41 is control for issuing an operation instruction to the travel control driver 46 and causing the autonomous snow removing machine 1 to travel so as not to travel out of the snow removal work region 54 on the basis of the current location of the autonomous snow removing machine 1 detected by the location detection processing.

The self-traveling operation control performed by the control unit 41 includes control for detecting obstacles such as people and the houses 52 existing ahead of the autonomous snow removing machine 1 and causing the autonomous snow removing machine 1 to travel so as to avoid the obstacles when it is detected that the obstacles exist on the basis of image analysis in accordance with the photographed image obtained by the camera 37 or object detection performed the radar system 38.

The snow removal operation control performed by the control unit 41 is control for issuing an operation instruction to the snow removal control driver 45 and driving the auger 31 and the blower by driving the throttle 25 of the engine 24.

In this case, in the snow removal operation control, the direction in which snow is thrown is adjusted so that the removed snow is collected in the snow collecting region 57 by rotatably driving the shooter 33 and driving the shooter guide 34 in a reciprocating manner in accordance with the location of the snow collecting region 57 set by the processing of setting the snow removal work region 54.

When the distance from the current location of the autonomous snow removing machine 1 to the snow collecting region 57 is far, the control unit 41 sets a temporary snow collecting region (not shown) between the current location and the snow collecting region 57. By performing the snow removal operation control, the control unit 41 performs control so as to first throw snow to the temporary snow collecting region, and then collect the snow in the snow collecting region 57 in the end. A plurality of the temporary snow collecting regions may be set.

The autonomous snow removing machine 1 may have a function of scattering a snow melting agent and may also simultaneously perform a work of scattering the snow melting agent when performing the snow removal work.

The control unit 41 can acquire the life pattern of the user from the mobile terminal apparatus 60 by communicating with the mobile terminal apparatus 60 via the communication unit 44.

For example, when the user sets an alarm by the mobile terminal apparatus 60, the control unit 41 acquires a wake-up time of the user from a time set for the alarm via the communication unit 44.

The control unit 41 sets a snow removal starting time of the autonomous snow removing machine 1 on the basis of the wake-up time of the user acquired from the mobile terminal apparatus 60 in the snow removal operation control. For example, the control unit 41 sets a work schedule for performing control such that the snow removal starts from a time earlier than the wake-up time so that the snow removal is completed by a predetermined amount or more before the user gets out of bed.

As a result, when the user gets out of bed, the snow removal of the snow removal work region 54 around the home of the user can be completed.

The control unit 41 can acquire the current location of the mobile terminal apparatus 60 by communicating with the mobile terminal apparatus 60 via the communication unit 44.

It can be determined that the mobile terminal apparatus 60 exists in the home of the user when it is determined that the current location of the mobile terminal apparatus 60 is near the current location of the autonomous snow removing machine 1, and it can be determined that the mobile terminal apparatus 60 does not exist in the home of the user when it is determined that the current location of the mobile terminal apparatus 60 is far from the current location of the autonomous snow removing machine 1.

The control unit 41 can acquire a time for going to work at which the user leaves the home of the user and a returning home time at which the user returns home by acquiring the current location of the mobile terminal apparatus 60. The control unit 41 sets a work schedule for performing control such that the snow removal is completed by a predetermined amount or more before the time for going to work or the returning home time.

As a result, the snow removal of the snow removal work region 54 around the home of the user can be completed when the user goes to work at the time for going to work and returns home at the returning home time.

The control unit 41 can acquire weather forecast information from the mobile terminal apparatus 60 by communicating with the mobile terminal apparatus 60 via the communication unit 44.

The control unit 41 estimates a snow removal time in accordance with the snowfall amount by acquiring the snowfall time and the snowfall amount on the basis of the weather forecast information acquired from the mobile terminal apparatus 60. The control unit 41 sets a snow removal work time on the basis of the estimated snow removal time.

The control unit 41 sets the work schedule by taking the snow removal work time into account when the snow removal work in accordance with the wake-up time, the time for going to work, and the returning home time of the user described above is performed.

The control unit 41 can estimate the average wake-up time, time for going to work, and returning home time of a day by acquiring the alarm set time, the time for going to work, and the returning home time of the mobile terminal apparatus 60 described above every day, only on weekdays, or only on days off, and the control unit 41 can set the work schedule for each day or each week on the basis of the estimated time.

As the starting timing at which the snow removal operation by the autonomous snow removing machine 1 is performed, a timing at which a snow removal starting instruction signal transmitted from the mobile terminal apparatus 60 of the user via the management cloud 61 is received by the communication unit 44, a timing in accordance with a timer based on the work schedule in accordance with the wake-up time, the time for going to work, and the returning home time described above, a timing at which there is a certain amount or more of fallen snow in the snow removal work region 54 in accordance with the image analysis of the photographed image of the camera 37, and the like are conceived.

The control unit 41 may transmit a collecting request to a snow removal contractor via the communication unit 44 when the amount of snow collected in the snow collecting region 57 becomes a certain amount or more.

Next, the operation of this embodiment is described.

FIG. 4 is a flowchart illustrating a snow removal work starting operation.

As illustrated in FIG. 4, when the snow removal work is started, the autonomous snow removing machine 1 is activated first (ST1), and the control unit 41 determines whether there is a starting instruction for the snow removal work (ST2). In this case, the starting instruction may be a starting instruction transmitted from the mobile terminal apparatus 60 by the user via the communication unit 44 or may be a starting instruction based on a preset work schedule, for example.

In addition, for example, the starting instruction may be conceived to be issued when the control unit 41 determines that there is a predetermined amount or more of fallen snow by analyzing the photographed image obtained by the camera 37.

When it is determined that there is a starting instruction (ST2: YES), the control unit 41 acquires the snow removal work region 54 (ST3). As the snow removal work region 54, the snow removal work region 54 stored in the storage unit 42 or the mobile terminal apparatus 60 may be acquired or the snow removal work region 54 may be successively acquired by recognizing the markers 56 of the poles 55 for work on the basis of the photographed images of the camera 37.

After the snow removal work region 54 is acquired, the control unit 41 transmits operation instructions to the travel control driver 46 and the snow removal control driver 45 (ST4) and starts the snow removal work by the autonomous snow removing machine 1 (ST5).

Figure 5:
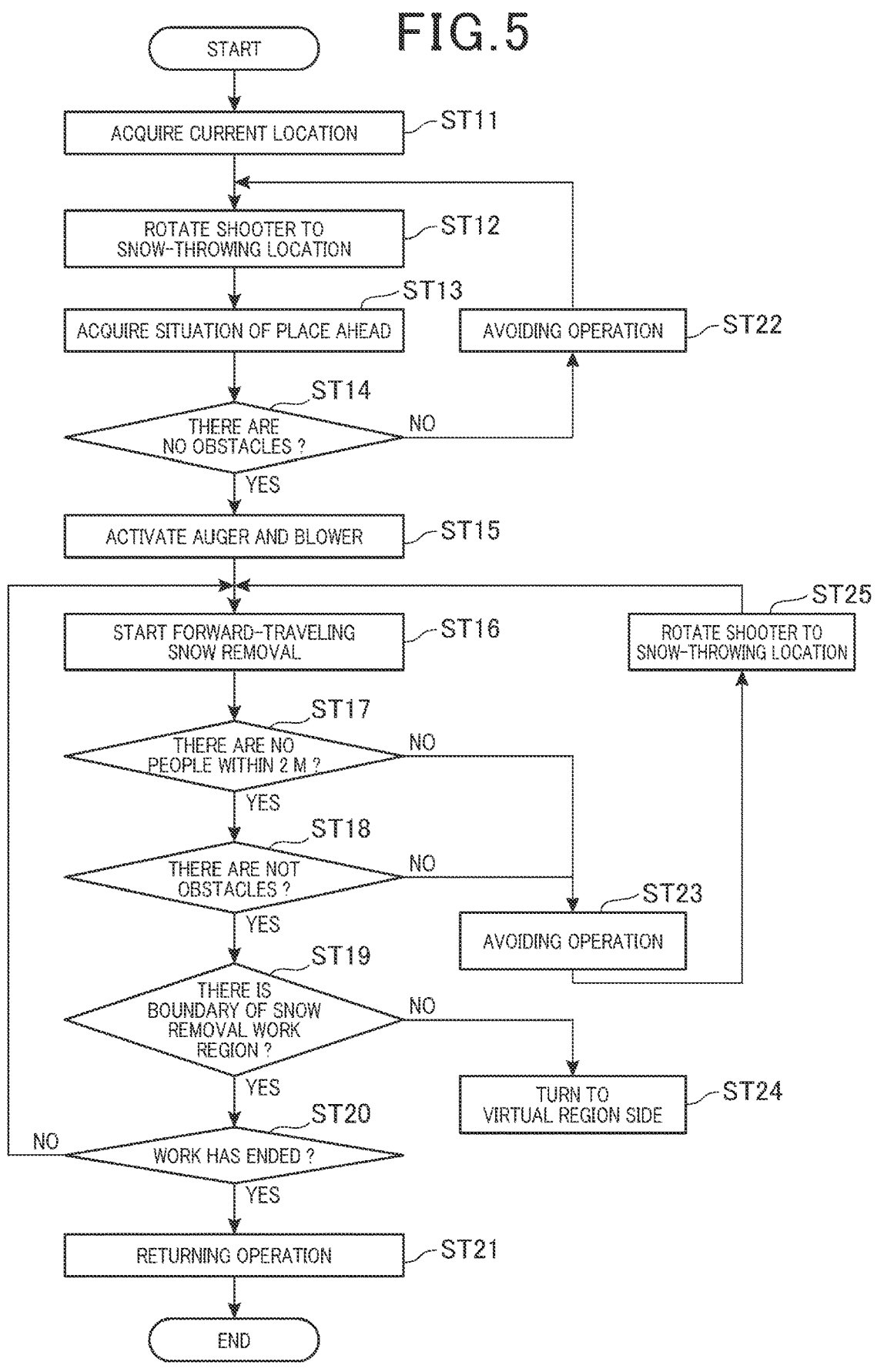
FIG. 5 is a flowchart illustrating a snow removal operation of this embodiment.

FIG. 5 is a flowchart illustrating the snow removal operation.

As illustrated in FIG. 5, the control unit 41 acquires the current location of the autonomous snow removing machine 1 in the snow removal work region 54 and the snow collecting region 57 by the GPS (ST11). The control unit 41 moves the shooter 33 so that the shooter 33 turns toward the snow collecting region 57 in accordance with the current location of the autonomous snow removing machine 1 (ST12).

Then, the control unit 41 acquires the situation of a place ahead of the autonomous snow removing machine 1 on the basis of the photographed image of the camera 37 and the detection result by the radar system 38 (ST13).

The control unit 41 determines whether an obstacle exists ahead of the autonomous snow removing machine 1 on the basis of the acquired situation ahead of the autonomous snow removing machine 1 (ST14).

When it is determined that an obstacle does not exist (ST14: YES), the control unit 41 issues an operation instruction to the snow removal control driver 45 and activates the auger 31 and the blower by driving the engine 24 (ST15). In this state, the control unit 41 issues an operation instruction to the travel control driver 46 and drives the traveling apparatuses 11 by driving the electric motors 23. As a result, the control unit 41 performs the snow removal work while moving the autonomous snow removing machine 1 forward (ST16).

Meanwhile, when it is determined that an obstacle exists ahead of the autonomous snow removing machine 1 (ST14: NO), the control unit 41 operates the autonomous snow removing machine 1 such that the autonomous snow removing machine 1 avoids the obstacle by issuing an operation instruction to the travel control driver 46 (ST22).

While the snow removal work is being performed, the control unit 41 acquires the situation ahead of the autonomous snow removing machine 1 on the basis of the photographed image of the camera 37 and the detection result of the radar system 38. Then, the control unit 41 determines whether a person exists within a predetermined range ahead of the autonomous snow removing machine 1 (ST17) and determines whether an obstacle exists (ST18).

When it is determined that a person exists within the predetermined range ahead of the autonomous snow removing machine 1 (ST17: NO) and when it is determined that an obstacle exists (ST18: NO), the control unit 41 performs operation so as to avoid the person or the obstacle by controlling the traveling apparatuses 11 (ST23).

After the avoidance, the control unit 41 moves the shooter 33 so as to correspond to the snow collecting region 57 on the basis of the current location of the autonomous snow removing machine 1 (ST25).

When the control unit 41 determines that a person or an obstacle does not exist ahead of the autonomous snow removing machine 1 (ST17, ST18: YES), the control unit 41 continues the snow removal work and determines whether the boundary of the snow removal work region 54 exists in the traveling direction of the autonomous snow removing machine 1 (ST19). In this case, the boundary of the snow removal work region 54 may be determined in accordance with the relationship between prestored information on the snow removal work region 54 and the current location of the autonomous snow removing machine 1 or the boundary of the snow removal work region 54 may be determined by recognizing the markers 56 formed on the poles 55 for work on the basis of the photographed image of the camera 37.

When it is determined that the boundary of the snow removal work region 54 exists (ST19: YES), the control unit 41 controls the traveling apparatuses 11, for example, causes the traveling apparatuses 11 to turn so that the autonomous snow removing machine 1 does not travel out of the snow removal work region 54 (ST24).

When the boundary of the snow removal work region 54 does not exist (ST19: NO) and it is determined that all of the snow removal work in the snow removal work region 54 has been completed (ST20: YES), the control unit 41 controls the autonomous snow removing machine 1 to return to a standby location (ST21).

When the snow removal work in the snow removal work region 54 is not completed (ST20: NO), the operations in Step 16 and steps thereafter are repeated (ST16).

As described above, in this embodiment, the autonomous snow removing machine includes: the traveling apparatuses 11; the snow removal work unit 12; the region setting unit that sets the snow removal work region 54 in which snow removal is performed by the snow removal work unit 12; and the control unit 41 that controls the traveling apparatuses 11 such that the traveling apparatuses 11 do not deviate from the snow removal work region 54 set by the region setting unit.

As a result, the snow removal work can be performed while causing the autonomous snow removing machine to autonomously travel with a high accuracy by controlling the traveling apparatuses 11 in the snow removal work region 54 set by the region setting unit.

In this embodiment, the autonomous snow removing machine includes the communication unit 44 that communicates with the mobile terminal apparatus 60 of the user.

As a result, the control unit 41 can perform the snow removal work in the snow removal work region 54 set by the mobile terminal apparatus 60 by communicating with the mobile terminal apparatus 60 by the communication unit 44.

In this embodiment, the region setting unit includes the camera 37 (image pickup apparatus) that photographs the markers 56 formed on the poles 55 for work installed on the boundary of the snow removal work region 54, and the control unit 41 reads the markers 56 and sets the snow removal work region 54 on the basis of the image photographed by the camera 37.

As a result, the snow removal work region 54 can be set by analyzing the image of the markers 56 of the poles 55 for work photographed by the camera 37.

In this embodiment, the control unit 41 sets the snow removal work region 54 on the basis of the information set by the mobile terminal apparatus 60 and transmitted via the communication unit 44.

As a result, the snow removal work region 54 can be set by the mobile terminal apparatus 60, and the snow removal work of the snow removal work region 54 set by the mobile terminal apparatus 60 can be performed.

In this embodiment, the control unit 41 sets the snow collecting region 57 in which removed snow is collected when the snow removal work region 54 is set, and the control unit 41 controls the snow removal work unit 12 such that the snow removal work unit 12 collects, in the snow collecting region 57, snow that has fallen in the snow removal work region 54.

As a result, the removed snow can be collected in the set snow collecting region 57.

In this embodiment, the poles 58 for snow collection that are different from the poles 55 for work are installed on the boundary of the snow collecting region 57, and the control unit 41 sets the snow collecting region 57 on the basis of the markers formed on the poles 58 for snow collection.

As a result, the snow collecting region 57 can be set by analyzing the image of the markers of the poles 58 for snow collection photographed by the camera 37.

In this embodiment, the GPS system 39 (location detecting unit) that detects the current location is further included, and the control unit 41 acquires the current location by the GPS system 39, and sets the temporary snow collecting region between the current location and the snow collecting region 57 when the distance between the current location and the snow collecting region 57 is a certain distance or more.

As a result, even when the current location of the autonomous snow removing machine 1 is far from the snow collecting region 57, snow can be collected in the snow collecting region 57 by the intermediary of the temporary snow collecting region.

In this embodiment, the snow removal work unit 12 includes the auger 31 that collects snow, and the blower that blows the snow collected by the auger 31, the snow removal work unit 12 collecting snow by blowing the snow in the snow removal work region 54 toward the snow collecting region 57 with use of the auger 31 and the blower.

As a result, the snow removal work can be performed by the auger 31 and the blower.

In this embodiment, the control unit 41 is capable of setting the work schedule for snow removal work and the control unit 41 removes snow by controlling the snow removal work unit 12 on the basis of the work schedule.

As a result, the control unit 41 can perform the snow removal work on the basis of the set work schedule.

In this embodiment, the control unit 41 acquires the wake-up time of the user and sets the work schedule such that the snow removal work is completed by a predetermined amount or more at the wake-up time.

As a result, the snow removal work can be performed on the basis of the work schedule based on the wake-up time of the user.

In this embodiment, the control unit 41 acquires the wake-up time from the alarm time set on the mobile terminal apparatus 60 of the user via the communication unit 44.

As a result, the snow removal work can be performed on the basis of the wake-up time of the user acquired from the alarm time of the mobile terminal apparatus 60.

In this embodiment, the control unit 41 acquires the location information of the mobile terminal apparatus 60 of the user via the communication unit 44 and sets the work schedule for the snow removal work on the basis of the location information of the mobile terminal apparatus 60.

As a result, the snow removal work can be performed on the basis of the work schedule in accordance with the location information of the user.

In this embodiment, the control unit 41 estimates the time at which the user reaches the snow removal work region 54 on the basis of the location information of the mobile terminal apparatus 60 of the user, and sets the work schedule such that the snow removal work is completed by a predetermined amount or more at the estimated reaching time.

As a result, the work schedule in accordance with the time for going to work and the returning home time of the user, for example, can be set by estimating the time at which the user reaches the snow removal work region 54 on the basis of the location information of the user.

In this embodiment, the control unit 41 acquires the weather forecast information from the mobile terminal apparatus 60 of the user via the communication unit 44, estimates the snowfall amount of the snow removal work region 54 on the basis of the weather forecast information, and sets the work schedule on the basis of the estimated snowfall amount.

As a result, the work schedule can be set in accordance with the snowfall amount of the snow removal work region 54 by acquiring the weather forecast information.

In this embodiment, the control unit 41 transmits the collecting request to the snow removal contractor from the communication unit 44 via the mobile terminal apparatus 60 when the amount of the snow collected in the snow collecting region 57 becomes a certain amount or more.

As a result, the snow accumulated in the snow collecting region 57 can be collected.

In this embodiment, at the time of the snow removal work performed by the snow removal work unit 12, the snow removal work is performed while the snow melting agent is sprinkled.

As a result, the snow removal work can be easily performed by sprinkling the snow melting agent.

The present invention is not limited to the description of the abovementioned embodiment, and various modification and changes can be made without deviating from the spirit of the present invention.

For example, the abovementioned embodiment has been described with use of an example in which the autonomous snow removing machine 1 including the auger 31 and the blower is used, but the present invention is not limited thereto. For example, the present invention can also be applied to the autonomous snow removing machine 1 including a blade called a dozer. As a result, the snow removal work can be performed by the blade.

REFERENCE SIGNS LIST

1 Autonomous snow removing machine
10 Vehicle main body
11 Traveling apparatus
12 Snow removal work unit
22 Power source
23 Electric motor
24 Engine
25 Throttle
26 Battery
31 Auger
33 Shooter
34 Shooter guide
37 Camera
38 Radar system
39 GPS system
40 Control system
41 Control unit
42 Storage unit
43 Operation unit
44 Communication unit
45 Snow removal control driver
46 Travel control driver
54 Snow removal work region
55 Pole for work
56 Marker
57 Snow collecting region
58 Pole for snow collection
60 Mobile terminal apparatus
61 Management cloud

What is claimed is:

1. An autonomous snow removing machine that autonomously travels in a predetermined snow removal work region, the autonomous snow removing machine comprising:

a traveling apparatus;

an auger that collects snow, and a shooter that throws collected snow to far by a blower; and a processor, wherein the processor:

detects a first marker for setting a snow removal work region in which snow removal is performed and a second marker for setting a snow collecting region which is in the snow removal work region and in which removed snow from the snow removal work region is collected, and sets the snow removal work region and the snow collecting region;

controls an autonomous traveling of the traveling apparatus such that the traveling apparatus does not deviate from the snow removal work region set; and controls the auger and the shooter to collect fallen snow on the snow removal work region to the snow collecting region, wherein the processor determines a current position of the autonomous snow removing machine by obtaining information of a GPS system, acquires positioning information emitted from a beacon to obtain a position of the snow collecting region, detects a distance from the current location of the autonomous snow removing machine to the snow collecting region, and determines whether the distance from the current location of the autonomous snow removing machine to the snow collecting region is a certain distance or more to set a temporary snow collecting region between the current location and the snow collecting region.

\* \* \* \* \*